(12) United States Patent
Quach

(10) Patent No.: US 8,228,573 B2
(45) Date of Patent: Jul. 24, 2012

(54) SYSTEM AND METHOD FOR INTERACTIVELY ACQUIRING OPTICAL COLOR MEASUREMENTS FOR DEVICE COLOR PROFILING

(75) Inventor: Tony T. Quach, Anaheim, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 614 days.

(21) Appl. No.: 12/455,754

(22) Filed: Jun. 5, 2009

(65) Prior Publication Data

US 2010/0309493 A1    Dec. 9, 2010

(51) Int. Cl.
    *H04N 1/60* (2006.01)
(52) U.S. Cl. .................................... 358/518; 358/504
(58) Field of Classification Search .................. 358/504, 358/518–521, 523, 527, 167

See application file for complete search history.

(56) References Cited

U.S. PATENT DOCUMENTS

| | | | |
|---|---|---|---|
| 6,008,907 A * | 12/1999 | Vigneau et al. | 358/504 |
| 6,922,261 B2 * | 7/2005 | Asano | 358/504 |
| 7,414,752 B2 * | 8/2008 | Adam et al. | 358/504 |
| 7,869,089 B2 * | 1/2011 | Horita | 358/504 |
| 2007/0024657 A1 * | 2/2007 | Zhang et al. | 347/19 |
| 2011/0058196 A1 * | 3/2011 | Teraue | 358/1.9 |

\* cited by examiner

*Primary Examiner* — Scott A Rogers
(74) *Attorney, Agent, or Firm* — SoCal IP Law Group LLP; Steven C. Sereboff; Jonathan Pearce

(57) ABSTRACT

The subject application is directed to a system and method for iteratively acquiring optical color measurements for device color profiling. A first color measurement data set, in a first color space, is received of a measured value for each of L discrete printed color patches in an M row by N column planar array, where L, M and N are positive integers greater than 2, and L is less than M×N. A visual rendering on a display of color patches arranged in M rows and N columns is generated from second color space measurement data. Profile data is generated of the transition between color data and color measurement data based upon the relationship between available printed patches and displayed patches. When L is less than M×N, a visual indicator is generated for the displayed row of the current L value. A second color measurement data set is received uniquely defined from the first set, which second set includes patches not found in the first set. Profile data is then generated based upon the second data set.

15 Claims, 12 Drawing Sheets

SYSTEM AND METHOD FOR INTERACTIVELY ACQUIRING OPTICAL COLOR MEASUREMENTS FOR DEVICE COLOR PROFILING

BACKGROUND OF THE INVENTION

The subject application is directed generally to color calibration relative to printing devices. The application is particularly applicable to calibration employing measurement of large number of color samples when all of such measurements are not completed at once.

Document rendering devices include printers which function to take electronic documents and reduce them to tangible output. Earlier printers rendered documents in black and white. Color printing, which is substantially more complex, extremely cost prohibitive, and limited to commercial applications. With the advancement of printing technology, color printing has become ubiquitous, and many options exist relative to color printing devices.

Display devices, such as monitors, generate visual output from visible light. Such devices generate various colors by mixing of additive primary colors. Many primary color sets exist. A popular additive color space in use today includes red, green and blue (RGB), Printers, on the other hand, generate tangible output by use of inks that function to selectively absorb colors from spectral light. Thus, printers employ color spaces formed from subtractive primaries. A subtractive primary in widespread use today in the printing industry is cyan, magenta and yellow (CMY). Various combinations of these basic colors can generate a large array of colors, referred to as a gamut. The gamut of a printer is frequently increased by addition of black ink (K), which color space is referred to as CMYK.

Modern document generation is completed with computers, operating in conjunction with software, such as word processing software, drawing applications, photo-editing applications, computer aided design applications, and the like. A computer employs a processor and memory, and a human interface is formed from a visual output display, and an input such as a keyboard, scanner, pointing device or network connection. Images are generated on the display, which is an active device generating output in an additive primary color space such as RGB. When a printout is desired, that color space must be converted to a subtractive color space for the printer, such as CMYK. Such conversion ideally maintains as much integrity between an image on a visual display terminal and that same image once it is printed out. Conversions are typically completed by formulas or use of empirically acquired conversion values stored in a lookup table, or some combination of the two.

Each printer has its own color gamut, which color gamut is defined in accordance with mechanical properties of the rendering mechanism, such as ink deposition technology. A printer's color gamut is also affected by other factors. Such factors include a number of primary colors that are used. Some printers augment the color set by additions of colors such as light cyan or light magenta to increase the color gamut. Other factors include the particular ink compositions, or variations within inks resulting from different batches or manufacturers.

In order to maintain as much integrity as possible between images encoded in different color spaces given the aforenoted factors, it is advantageous to generate a color conversion based on actual measurements taken from printed outputs. One such calibration process employs a printout taken from the printer, which printout has a number of color patches corresponding to different colors taken from the printer gamut. Each patch is associated with a value in a multidimensional color space. A color sensitive scanner acquires visual readings of each of these patches. Comparison of measured values facilitates generation of conversion factors between the color space of a display device and a color space of a printing device. In order to be accurate, many different measurements need to be taken. The greater number the measurements, the greater the resultant conversion will be between the two color spaces. However, securing so many measurements requires allocation of a single, large consecutive block of scanner activity, which may be a human-intensive activity, as well as occupying computer hardware for large blocks of time. Failure to complete the process requires that it be restarted from the beginning.

SUMMARY OF THE INVENTION

In accordance with one embodiment of the subject application, there is provided a system and method for iteratively acquiring optical color measurements for device color profiling. A first color measurement data set is received corresponding to a measured value for each of a plurality of L discrete printed color patches in an M row by N column planar array, with the color measurement data is encoded in a first multidimensional color space, L, M and N are positive integers greater than 2, and L is less than M×N. Color data, encoded in a second multidimensional color space, is received corresponding to each measured value. On an associated display, a visual rendering is generated of display color patches arranged in M rows and N columns. The visual rendering is completed from color measurement data encoded in a second multidimensional color space. Profile data is then generated corresponding to the transition between color data and color measurement data in accordance with the relationship between available corresponding printed color patches and the color patches displayed on the associated display. When L is less than M×N, a visual indicator is generated corresponding to one of the M rows on the display in which the current L value resides. At least a second color measurement data is received that is uniquely defined from the first color measurement data set. Preferably, the second color measurement data set includes a plurality of the M×N patches not found in the first color measurement data set. Profile data is then generated based upon the second color measurement data set.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The subject application is described with reference to certain figures, including.

DETAILED DESCRIPTION OF THE PREFERRED EMBODIMENT

The subject application is directed to a system and method for color calibration relative to printing devices. In particular, the subject application is directed to a system and method for calibration employing measurement of large number of color samples when all of such measurements are not completed at once. It will become apparent to those skilled in the art that the system and method described herein are suitably adapted to a plurality of varying electronic fields employing iterative processing, including, for example and without limitation, communications, general computing, data processing, document processing, financial transactions, vending of products or services, or the like. The preferred embodiment, as depicted in FIG. 1, illustrates a document processing field for example purposes only and is not a limitation of the subject application solely to such a field.

Figure 1:
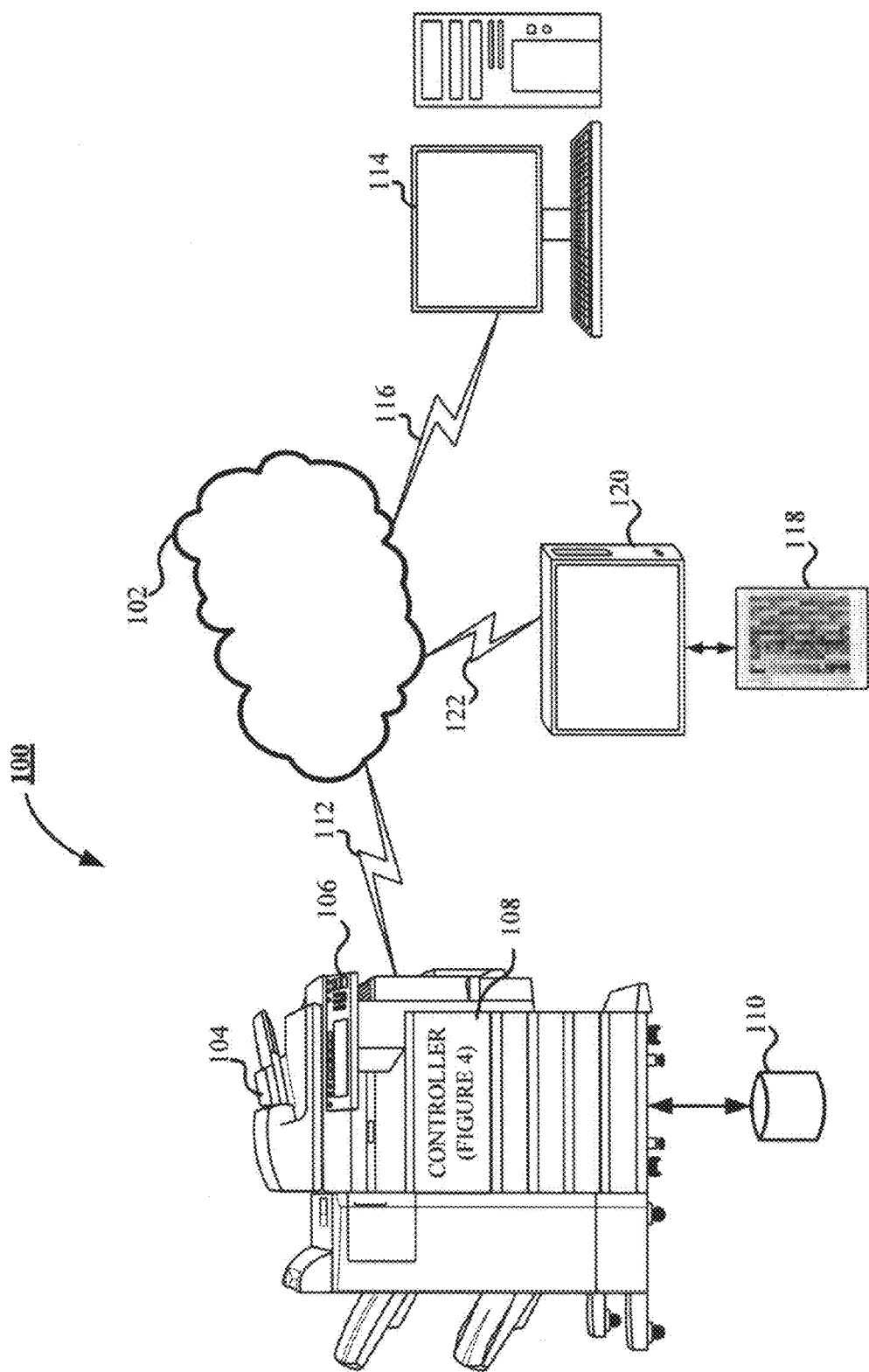
FIG. 1 is an overall diagram of a system for iteratively acquiring optical color measurements for device color profiling according to one embodiment of the subject application.

Referring now to FIG. 1, there is shown an overall diagram of an example system 100 for implementation of iteratively acquiring optical color measurements for device color profiling in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like. According to one particular embodiment of the subject application, the document processing device 104 includes an audio reproduction component (not shown) such as a speaker, or the like, capable of emitting tones, sounds, warnings, and the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for iteratively acquiring optical color measurements for device color profiling. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, color measurement data, color calibration data, or the like. It will be appreciated by those skilled in the art that while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive, or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like.

Depicted in FIG. 1 is a user device 114, illustrated as a computer workstation in data communication with the computer network 102 via a communications link 116. It will be appreciated by those skilled in the art that the user device 114 is shown in FIG. 1 as a computer workstation for illustration purposes only. As will be understood by those skilled in the art, the user device 114 is representative of any personal computing device known in the art including, for example and without limitation, a laptop computer, a workstation computer, a personal data assistant, a web-enabled cellular telephone, a smart phone, a proprietary network device, or other web-enabled electronic device. The communications link 116 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. In accordance with one embodiment of the subject application, the user device 114 is suitably configured to facilitate the receipt and storage of color calibration data, facilitate the generation of displays associated with such color information, and communicate color calibration and measurement data from an associated color measurement device 120 (discussed below), an associated document processing device 104, and the like. According to one particular embodiment of the subject application, the user device 114 includes an audio reproduction component (not shown) such as a speaker, or the like, capable of emitting tones, sounds, warnings, and the like. The functioning of the user device 114 will better be understood in conjunction with the diagram illustrated in FIG. 6, explained in greater detail below.

Shown in FIG. 1 is a printout 118 that comprises a color array for use in the system and method for color printer calibrator employing measurement success feedback in accordance with one embodiment of the subject application. In accordance with one embodiment of the subject application, the printout 118 is representative of a printed target, which includes multiple columns and rows of color patches. According to such an embodiment, the color patches that comprise the printout 118 are drawn with 20 to 30 pixels in width and 20 to 30 pixels in height, with a white space between color patches of 1 to 2 pixels. Preferably, each row and column in the printout is suitably labeled. In the subject application, such a targeted printout 118 is advantageously used to facilitate the calibration of color output devices, such as the document processing device 104. The images comprising the printout 118 of FIG. 1 will be better understood in conjunction with the example color printout of FIG. 11, as well as the screen illustration of FIG. 12, discussed in greater detail below.

FIG. 1 further depicts a color measurement device 120 in data communication with the computer network 102 via a suitable communications link 122. It will be appreciated by those skilled in the art that such a color measurement device 120 is suitably configured to receive and scan the targeted printout 118 in order to generate suitable color calibration data for use in calibrating the output of an associated display, an associated document output device, or the like. As will be understood by those skilled in the art, any suitable densitometer, calorimeter, spectrophotometer, or the like is capable of functioning as the color measurement device 120 in accordance with the subject application. Preferably, any color calibration data generated by the device 120 is capable of being communicated to the document processing device 104, the user device 114, or other device for color calibration, as will be appreciated by those skilled in the art. It will be understood by those skilled in the art that such a color measurement device 120 is further capable of including software, hardware, or a suitable combination thereof, configured to collect and prepare measured color calibration data for use in the subject system and method for iteratively acquiring optical color measurements for device color profiling.

Figure 2:
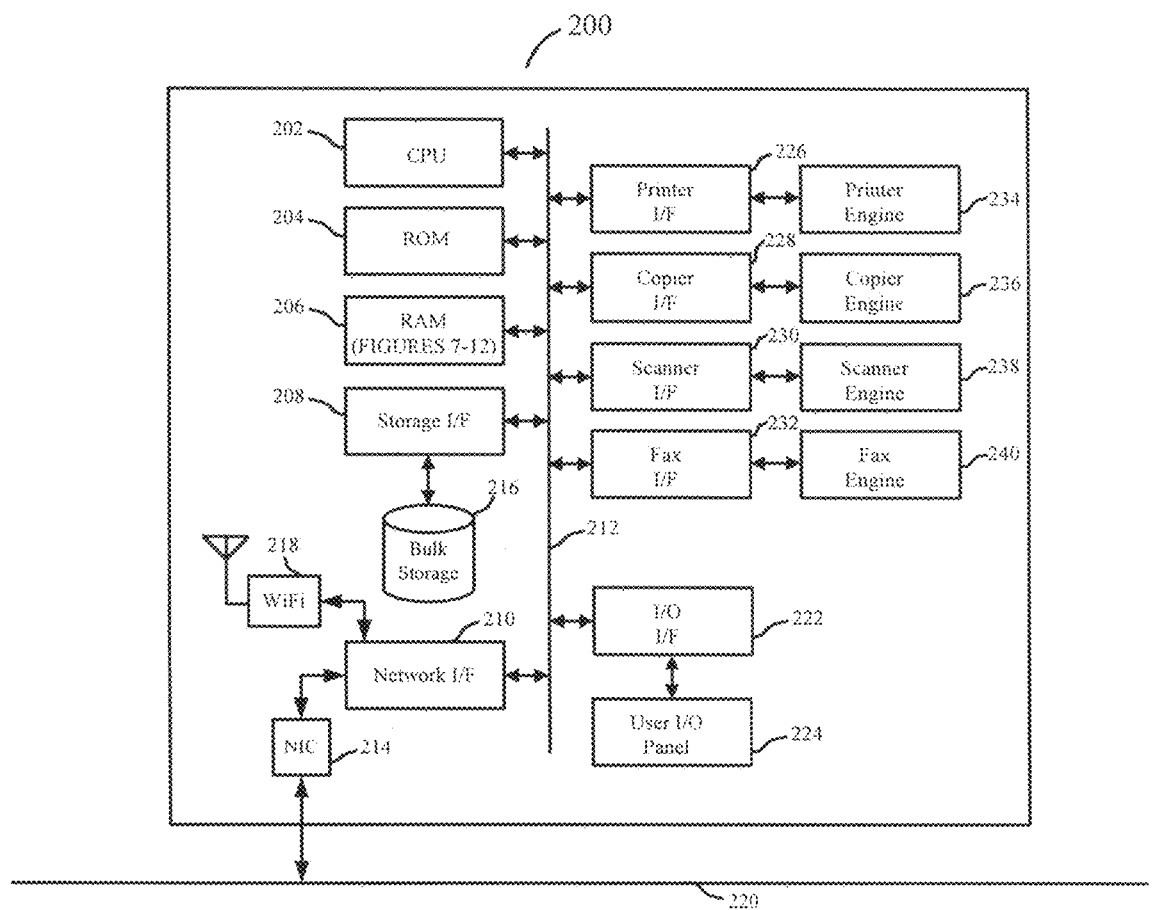
FIG. 2 is a block diagram illustrating device hardware for use in the system for iteratively acquiring optical color measurements for device color profiling according to one embodiment of the subject application.

Turning now to FIG. 2, illustrated is a representative architecture of a suitable device 200, shown in FIG. 1 as the document processing device 104, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
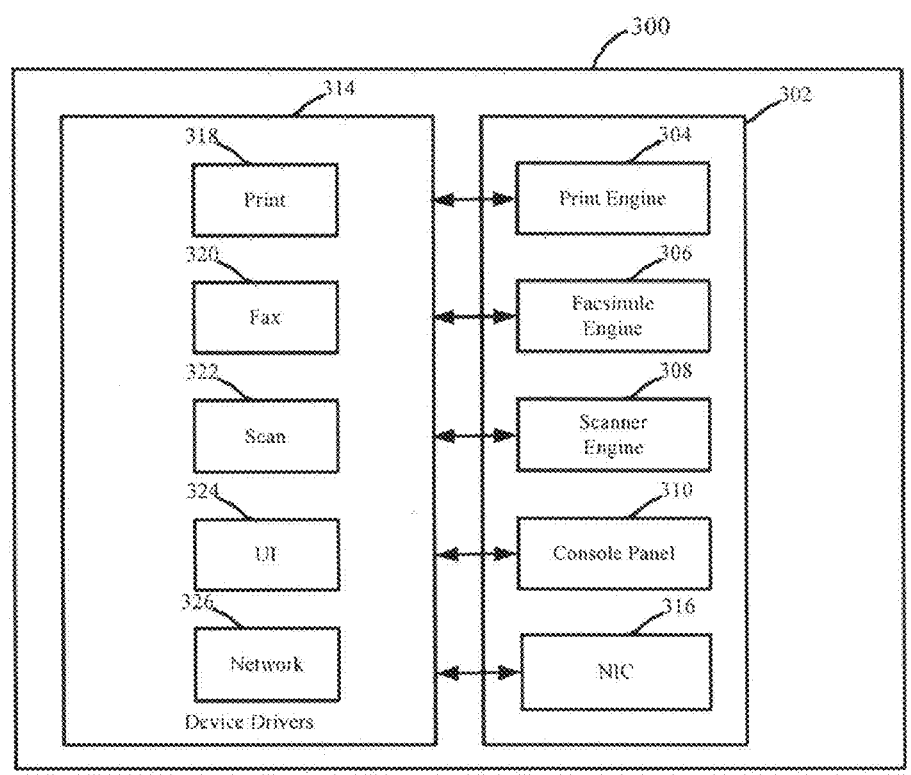
FIG. 3 is a functional diagram illustrating the device for use in the system for iteratively acquiring optical color measurements for device color profiling according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
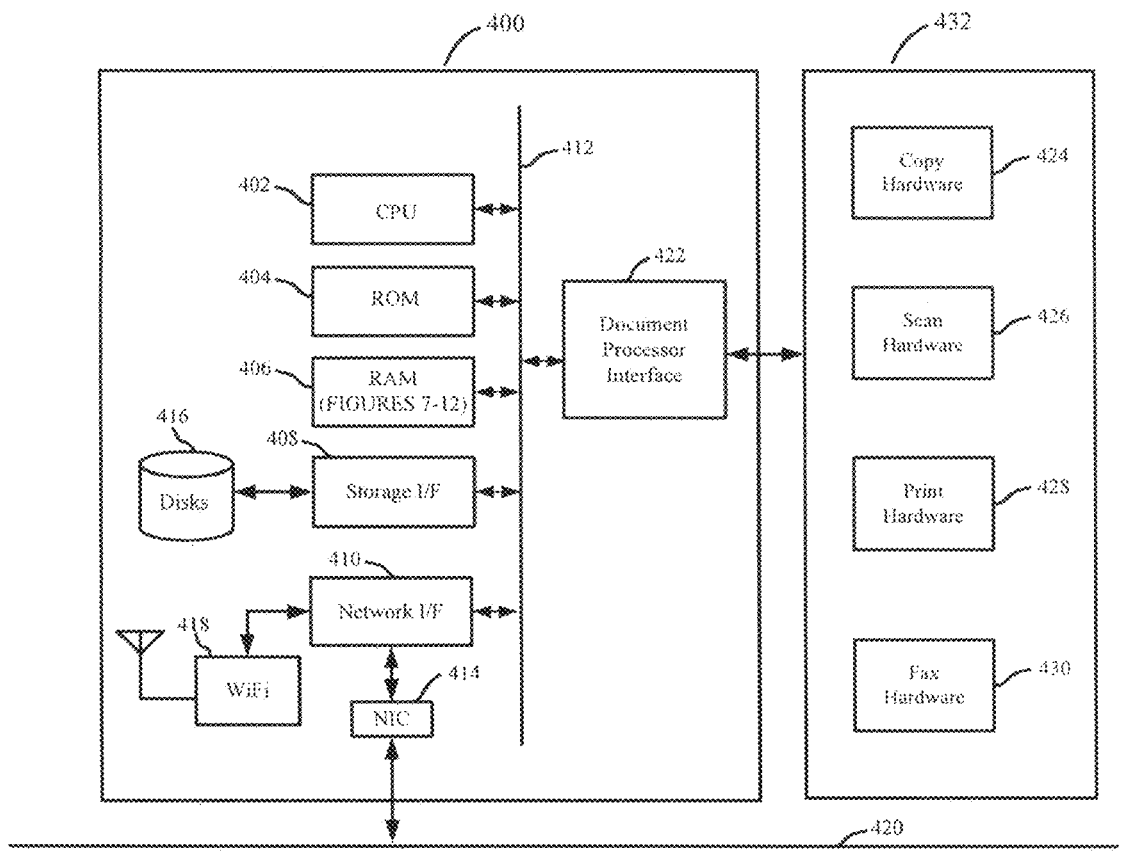
FIG. 4 is a block diagram illustrating controller hardware for use in the system for iteratively acquiring optical color measurements for device color profiling according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
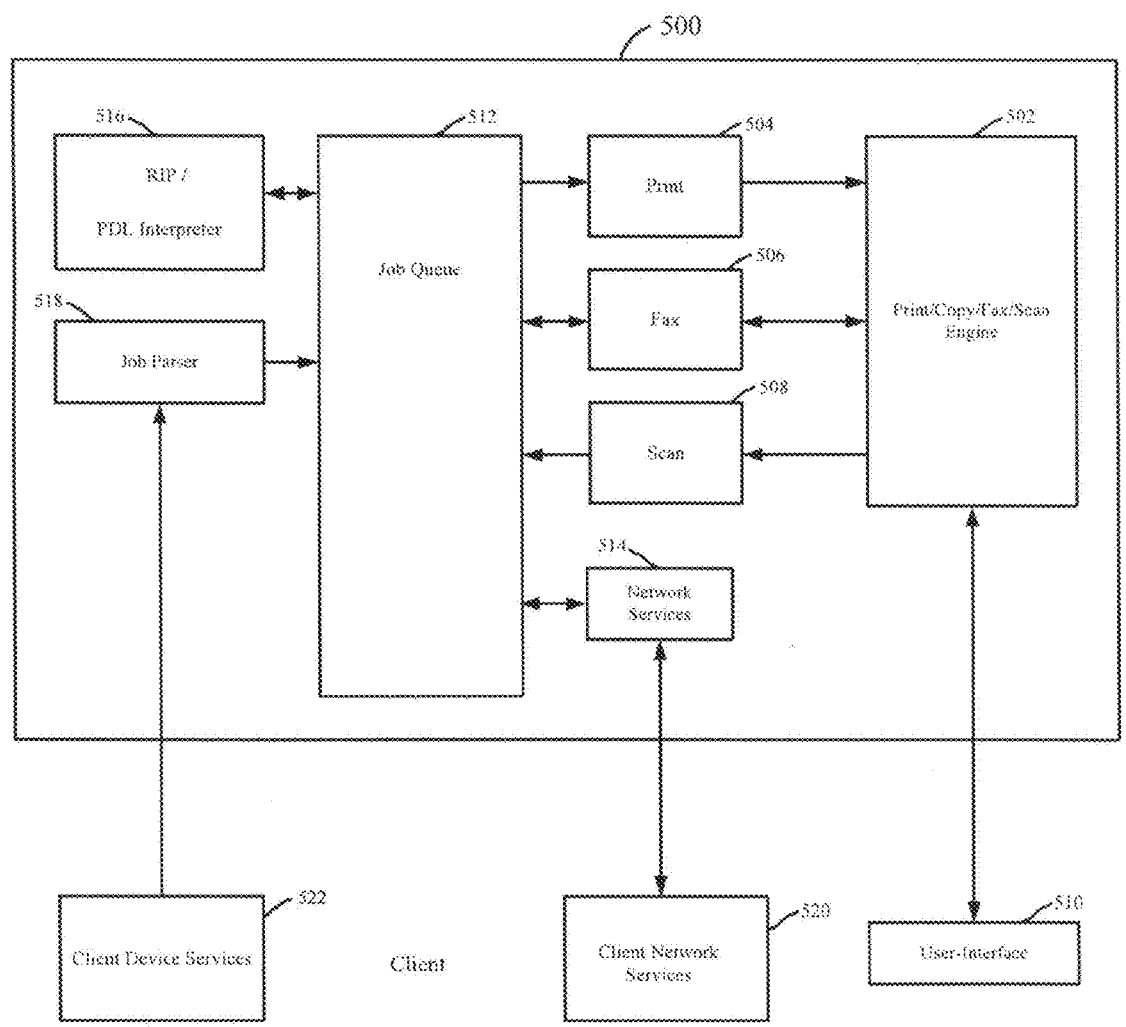
FIG. 5 is a functional diagram illustrating the controller for use in the system for iteratively acquiring optical color measurements for device color profiling according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment includes a document processing engine 502. Suitable controller functionality is then incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 508 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
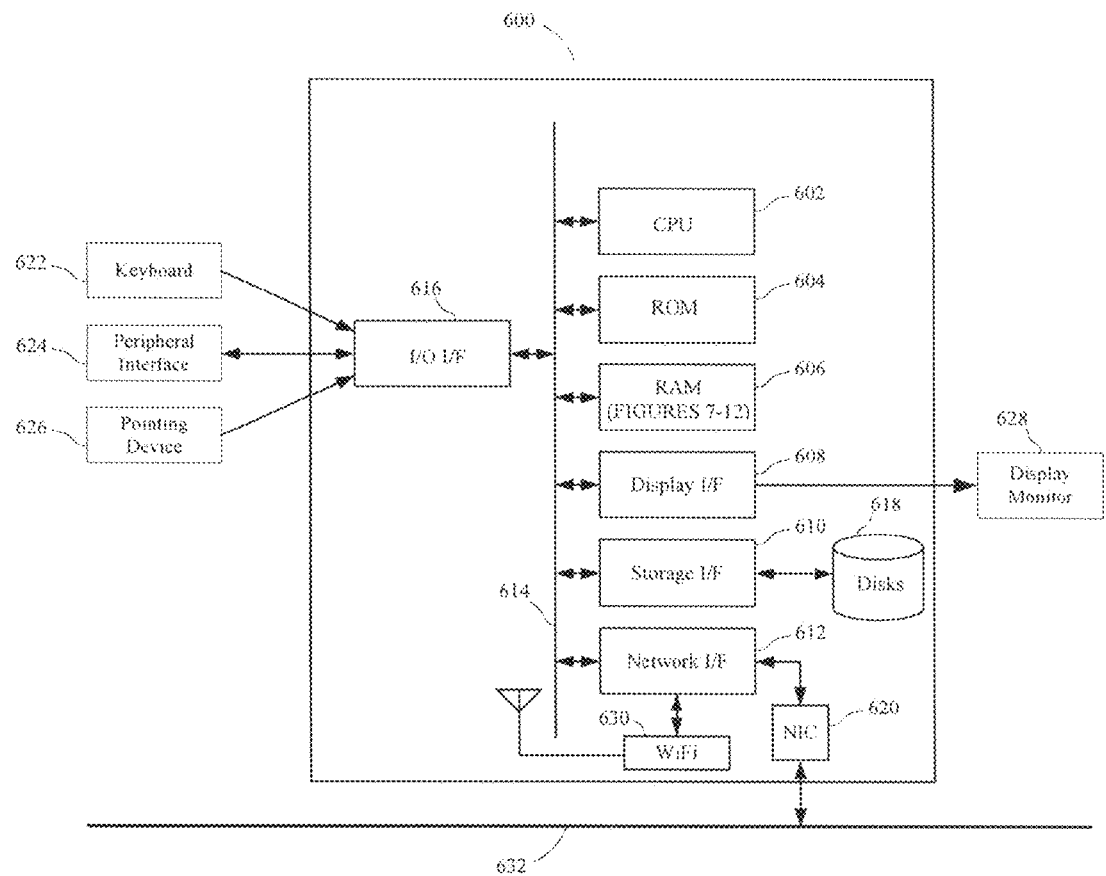
FIG. 6 is a diagram illustrating an administrative workstation for use in the system for iteratively acquiring optical color measurements for device color profiling according to one embodiment of the subject application.

Turning now to FIG. 6, illustrated is a hardware diagram of a suitable workstation 600, shown as the user device 114, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
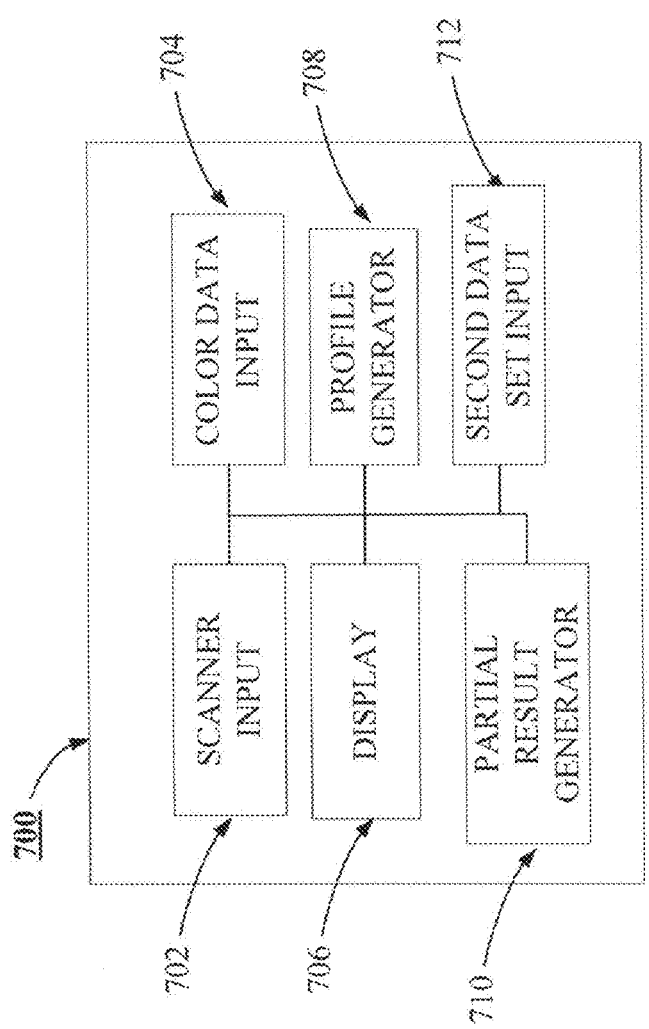
FIG. 7 is a block diagram illustrating the system for iteratively acquiring optical color measurements for device color profiling according to one embodiment of the subject application.

Turning now to FIG. 7, illustrated is a block diagram of a system 700 for iteratively acquiring optical color measurements for device color profiling in accordance with one embodiment of the subject application. The system 700 includes a scanner input 702 configured to receive a first color measurement data set. According to one embodiment of the subject application, the first color measurement data set corresponds to a measured value for each of a plurality of L discrete printed color patches in an M row by N column planar array. Preferably, the color measurement data is encoded in a first multidimensional color space. In accordance with one embodiment of the subject application, L, M and N are positive integers greater than 2, and L is less than M×N.

The system 700 further includes a color data input 704 that is capable of receiving color data corresponding to each measured value. Preferably, the color data is encoded in a second multidimensional color space. The system 700 also incorporates a display 706, which is configured to generate a visual rendering of display color patches arranged in M rows and N columns and corresponding to each printed color patch. The skilled artisan will appreciate that such a visual rendering is completed from color measurement data encoded in a second multidimensional color space. A profile generator 708 is also incorporated into the system 700 and is operable to generate profile data corresponding to a transition between the color data and the color measurement data based upon the relationship between available printed color patches and displayed color patches.

In addition, the system 700 includes a partial result generator 710 that is configured, when L is less than M×N, to generate a visual indicator corresponding to one of the M rows on the display 706, which row corresponds to a row in which the current L value is located. The system 700 also employs a second data set input 712 that is capable of receiving at least a second color measurement data set uniquely defined from the first color measurement data set. According to such an embodiment, the second color measurement data set includes the M×N patches not found in the first color measurement data set. The skilled artisan will appreciate that the color profile generator 708 is further operable to generate the profile data in accordance with the second color measurement data set.

Figure 8:
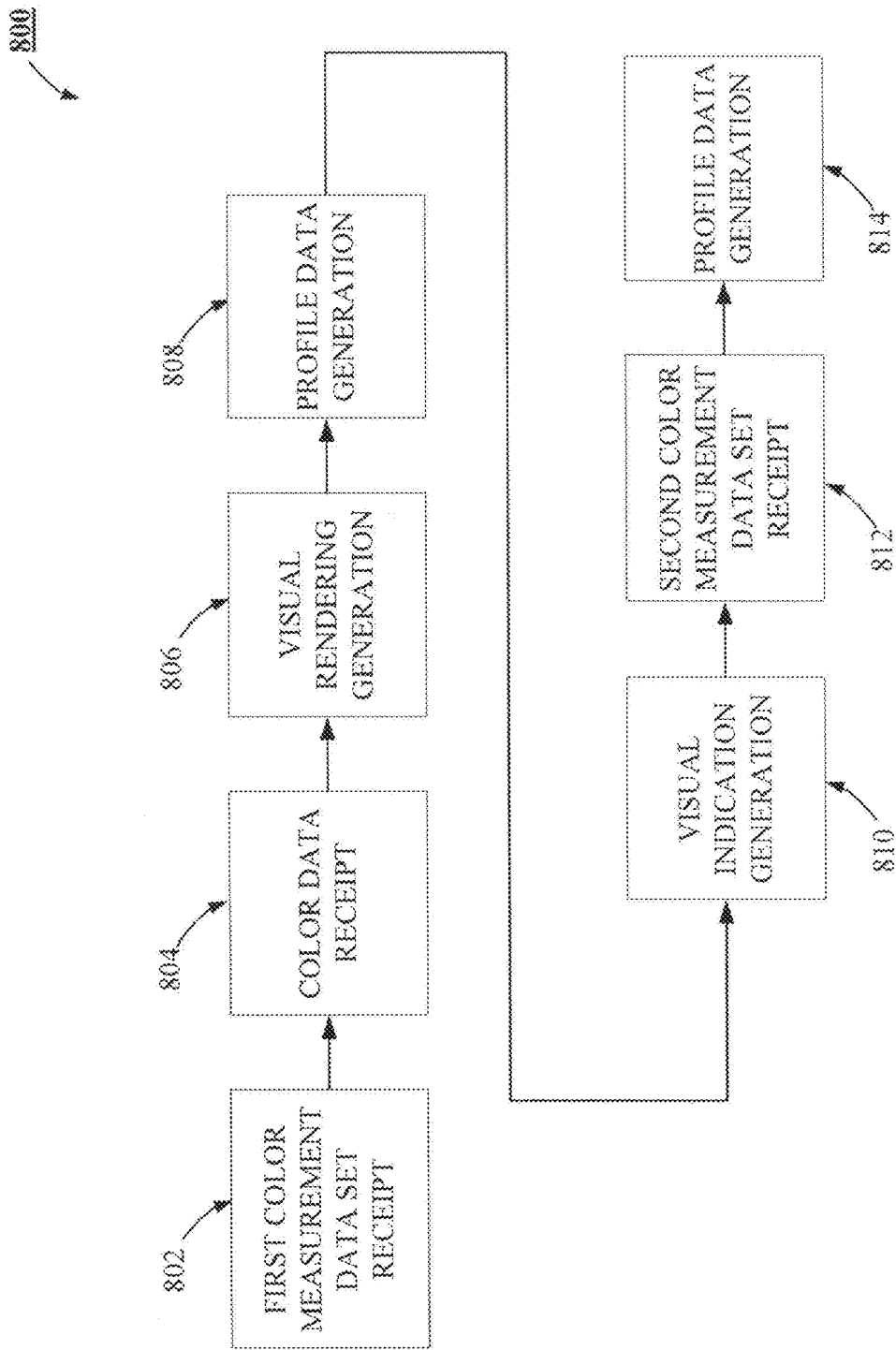
FIG. 8 is a functional diagram illustrating the system for iteratively acquiring optical color measurements for device color profiling according to one embodiment of the subject application.

Referring now to FIG. 8, there is shown a functional diagram illustrating the system 800 for iteratively acquiring optical color measurements for device color profiling in accordance with one embodiment of the subject application. First color measurement data set receipt 802 first occurs, with the data set corresponding to a measured value for each of a plurality of L discrete printed color patches in an M row by N column planar array. Preferably, the color measurement data is encoded in a first multidimensional color space, and wherein L, M and N are positive integers greater than 2, and wherein L is less than M×N. Color data receipt 804 is then performed of color data corresponding to each measured value. According to one embodiment of the subject application, the color data is encoded in a second multidimensional color space.

Generation 806 then occurs of visual rendering of display color patches on an associated display. In accordance with one embodiment of the subject application, the color patches are arranged in M rows and N columns and corresponding to each printed color patch. Preferably, the visual rendering is completed from color measurement data encoded in a second multidimensional color space. Next, profile data generation 808 is performed of profile data that corresponds to a transition between color data and color measurement data based upon a relationship between available corresponding printed color patches and displayed color patches.

Visual indicator generation 810 is then performed of a visual indicator corresponding to one of the M rows on the display when L is less than M×N. Preferably, the one of the M rows on the display corresponds to a row in which the current L value resides. Second color measurement data set receipt 812 then occurs of a measurement data set uniquely defined from the first color measurement data set. According to one embodiment of the subject application, the second color measurement data set includes a plurality of the M×N patches not found in the first color measurement data set. Thereafter, profile data generation 814 is performed in accordance with the second color measurement data set.

Figure 11:
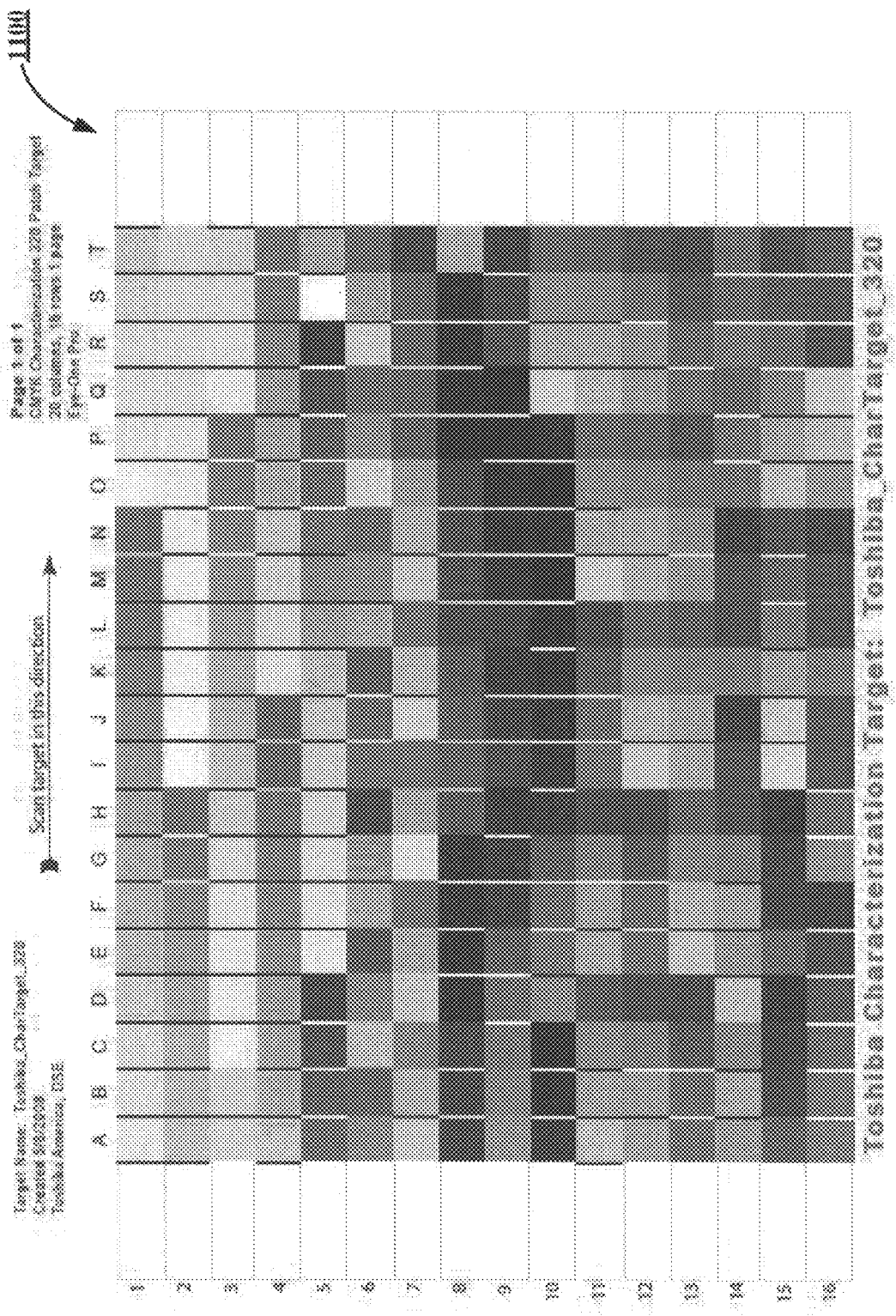
FIG. 11 is an example illustration of a color printout for use in the system and method for iteratively acquiring optical color measurements for device color profiling according to one embodiment of the subject application.
Figure 12:
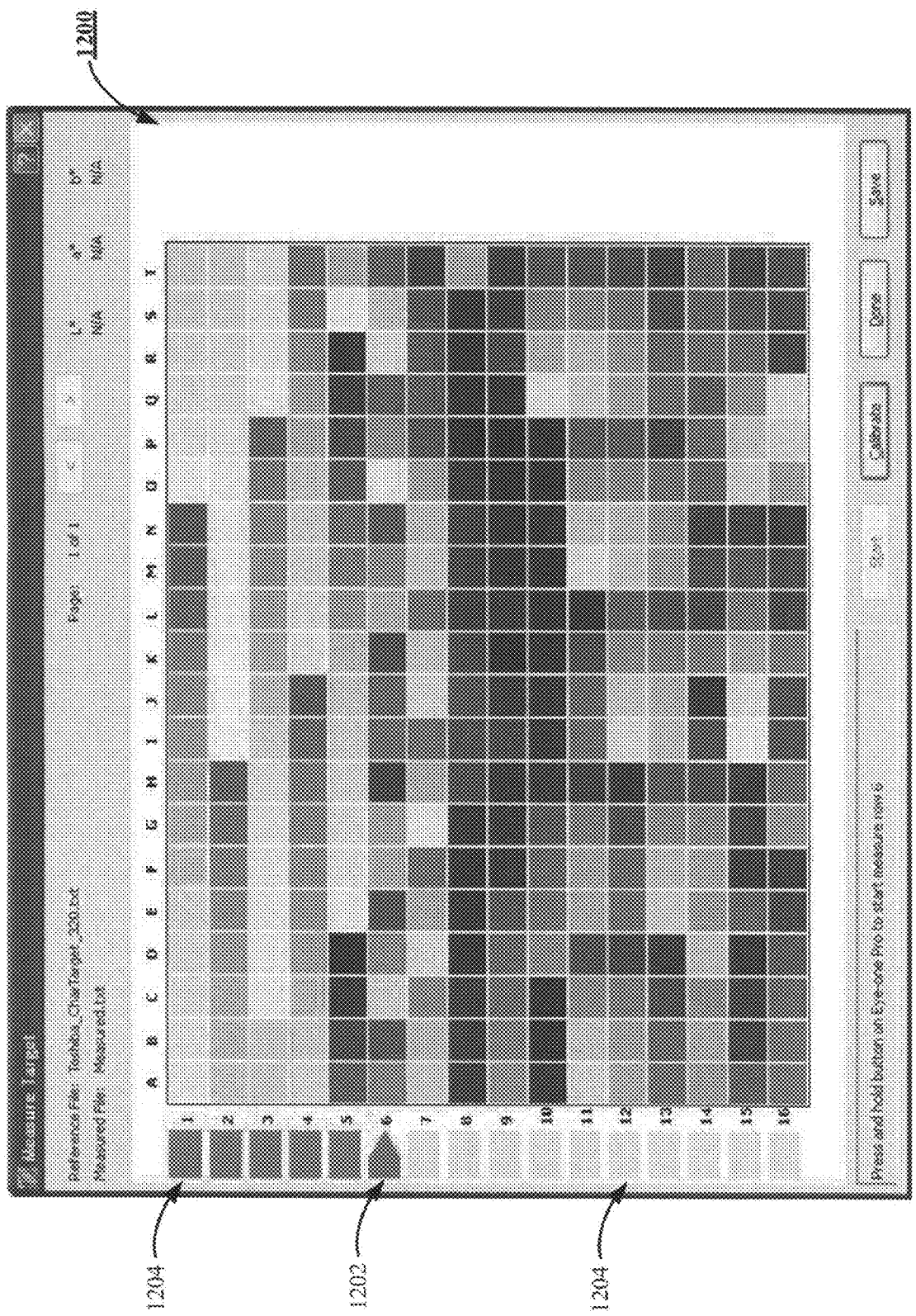
FIG. 12 is an example illustration of a screen of color input data corresponding to the color printout for use in the system and method for iteratively acquiring optical color measurements for device color profiling according to one embodiment of the subject application.

The skilled artisan will appreciate that the subject system 100 and components described above with respect to FIG. 1, FIG. 2, FIG. 3, FIG. 4, FIG. 5, FIG. 6, FIG. 7, and FIG. 8 will be better understood in conjunction with the methodologies described hereinafter with respect to FIG. 9 and FIG. 10, as well as the example illustrations of FIG. 11 and FIG. 12.

Figure 9:
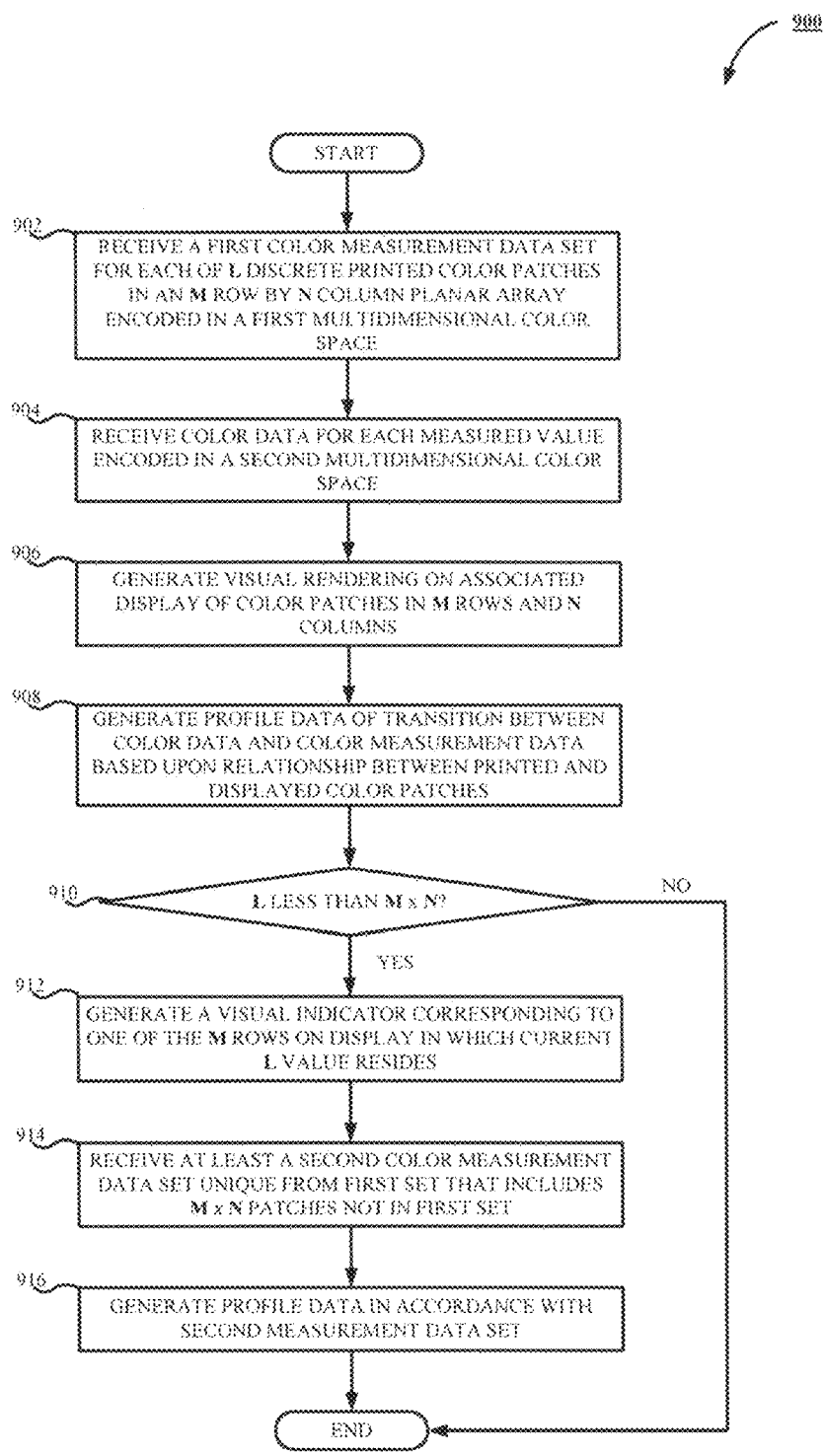
FIG. 9 is a flowchart illustrating a method for iteratively acquiring optical color measurements for device color profiling according to one embodiment of the subject application.

Turning now to FIG. 9, there is shown a flowchart 900 illustrating a method for iteratively acquiring optical color measurements for device color profiling in accordance with one embodiment of the subject application. Beginning at step 902, a first color measurement data set is received corresponding to a measured value for each of a plurality of L discrete printed color patches in an M row by N column planar array. Preferably, the color measurement data is encoded in a first multidimensional color space, L, M and N are positive integers greater than 2, and L is less than M×N. FIG. 11 illustrates a suitable array 1100 having M rows and N columns for use in accordance with one example embodiment of the subject application.

At step 904, color data, encoded in a second multidimensional color space, is received corresponding to each measured value. On an associated display, a visual rendering is generated of display color patches arranged in M rows and N columns at step 906. Preferably, the visual rendering is completed from color measurement data encoded in a second multidimensional color space. Profile data is then generated at step 908 corresponding to the transition between color data and color measurement data in accordance with the relationship between available corresponding printed color patches and the color patches displayed on the associated display.

A determination is then made at step 910 whether the value L is less than M×N. When L is not less than M×N, operations with respect to FIG. 9 terminate. Upon a determination at step 910 that L is less than M×N, operations with respect to FIG. 9 progress to step 912. At step 912, a visual indicator is generated corresponding to one of the M rows on the display in which the current L value resides. At least a second color measurement data is received at step 914 that is uniquely defined from the first color measurement data set. Preferably, the second color measurement data set includes a plurality of the M×N patches not found in the first color measurement data set. Profile data is then generated at step 916 based upon the second color measurement data set.

Figure 10:
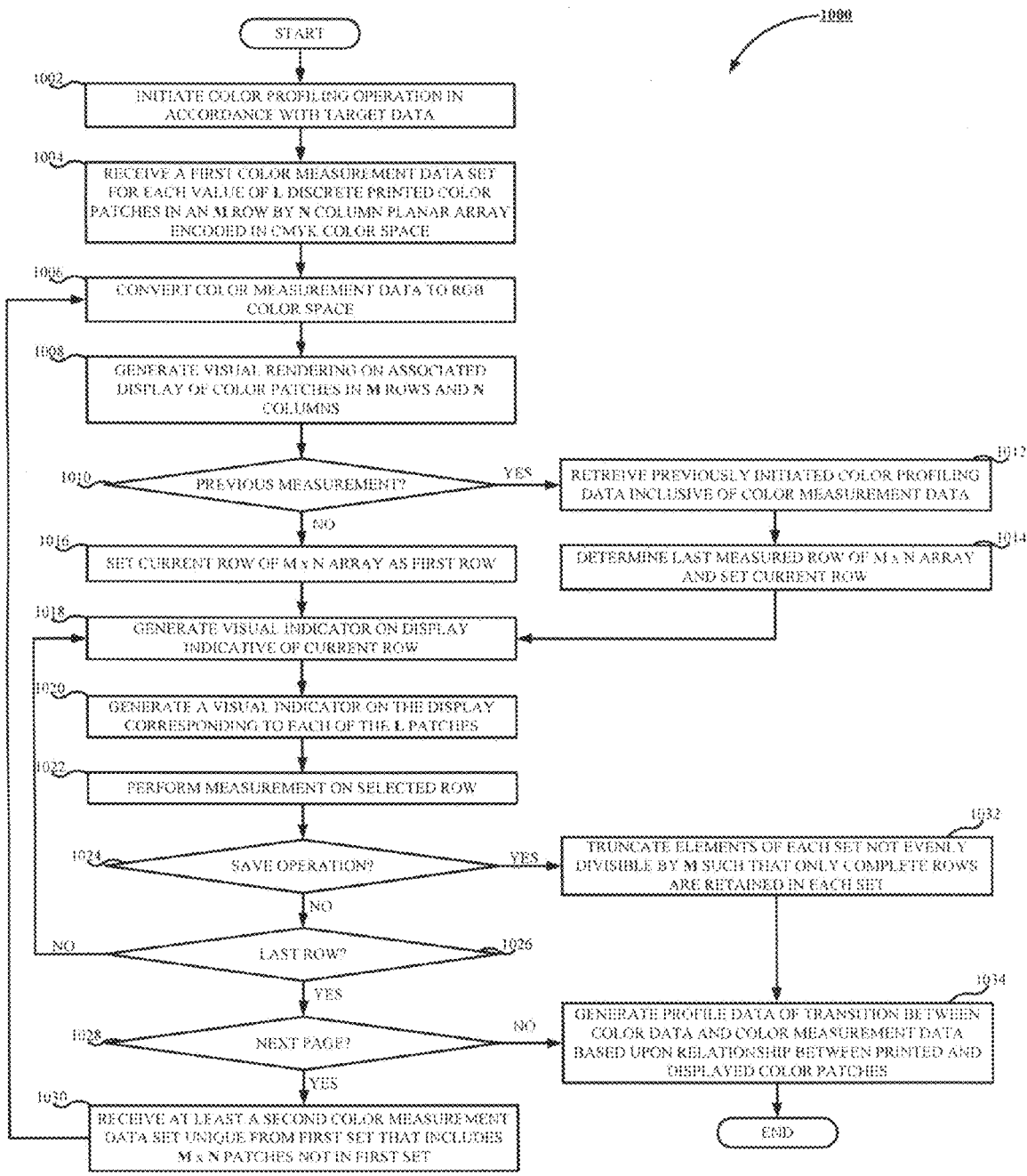
FIG. 10 is a flowchart illustrating a method for iteratively acquiring optical color measurements for device color profiling according to one embodiment of the subject application.

Referring now to FIG. 10, there is shown a flowchart 1000 illustrating a method for iteratively acquiring optical color measurements for device color profiling in accordance with one embodiment of the subject application. The methodology of FIG. 10 begins at step 1002, whereupon a color profiling operation is initiated for an associated document processing device 104 by an associated user in accordance with suitable target data. It will be appreciated by those skilled in the art that such initiation is capable of being undertaken via the workstation 114 or via the controller 108 associated with the document processing device 104. In accordance with one embodiment of the subject application, a color measurement device 120 generates target data from the color printout 118 of M×N discrete color areas. In such an embodiment, each color area of the printout 118 is comprised of a rectangle, or patch, having a preselected number of pixels, e.g. each patch having a length and width in the range of 20 pixels to 30 pixels. In the preceding example embodiment, each patch is preferably separated from one another by a range of 1 pixel to 2 pixels. At step 1004, a first color measurement data set for each value of L discrete printed color patches arranged in an M row by N column planar array encoded in CMYK color space is received by the workstation 114 or other component, e.g. the controller 108, associated with the computer network 102. According to one embodiment of the subject application, a color measurement data set includes, for example and without limitation, XYZ data, L*a*b* data, spectral data, row data, CMYK data, and the like.

At step 1006, the color measurement data received at step 1004 is converted from the CMYK color space to an RGB color space. A visual rendering is then generated on an associated display of color patches in M rows and N columns at step 1008. FIG. 12 illustrates a suitable screen template depicting such a visual rendering 1200 of an array of M rows and N columns of color patches. At step 1010, a determination is made whether the color profiling operation initiated at step 1002 represents a new operation or an incomplete previous operation. When it is determined at step 1010 that the current profiling operation is not a continuation of previous operation, flow proceeds to step 1016, whereupon the current row of M rows is set as the first row in the M×N array, as illustrated in FIG. 12. Operations then continue from step 1016 to step 1018 as set forth in greater detail below. Upon a determination at step 1010 that the profiling operation is a previous operation, flow proceeds to step 1012, whereupon previously initiated color profiling data, inclusive of associated color measurement data, is retrieved by the workstation 114, by the controller 108, or other suitable component associated with the color profiling system 100 of FIG. 1. According to one example embodiment of the subject application, the previously initiated color profiling data is stored in a CGATS file, which includes XYZ data, L*a*b* data, CMYK data, spectral data, row data, order data and the like.

The last measured row M of the visual rendering 1200 is then determined at step 1014 and set as the current row in which measurement is to be performed. A visual indicator 1202 is then generated on the display 1200 indicating the current row at step 1018. It will be appreciated by those skilled in the art that the indicator 1202 generated at step 1018 indicates one of the M rows in which the current L value resides. At step 1020, a visual indicator is generated on the display for each of the L patches, i.e. an indicator 1204 next to each of M rows. At step 1022, a measurement is performed on the current row so as to obtain an optical color measurement for that row, as will be appreciated by those skilled in the art. A determination is then made at step 1024 whether to save the current operation, i.e. whether the color profiling operation is to continue at a later time. Upon a positive determination at step 1024, flow proceeds to step 1032, whereupon the elements of each set not evenly divisible by M are truncated such that only complete rows are retained in the color measurement data of each set. Thereafter, profile data is generated of the transition between color data and color measurement data (of each set) based upon the relationship between printed and displayed color patches at step 1034.

When it is determined at step 1024 that the user does not desire to save the current profiling operation and instead continue profiling, flow progresses from step 1024 to step 1026. At step 1026, a determination is whether the last of M rows in the current measurement data set has been reached. Upon a negative determination, flow returns to step 1018 for the generation of a visual indicator at the next row to be designated as current. Operations with respect to FIG. 10 then continue from step 1018 set forth above. When it is determined at step 1026 that the last row has been processed, flow proceeds to step 1028, whereupon a determination is made whether another page of the target remains for processing. A negative determination at step 1028 prompts the generation of color profiling data at step 1034, hereafter operations with respect to FIG. 10 terminate.

Upon a determination at step 1028 that additional pages remain, flow proceeds to step 1030, whereupon at least a second color measurement set unique from the first set is received that includes M×N patches not in the first set. For example, when the color device profiling operation employs a target (color printout) having more than one page of color patches, e.g. two, three, five, or the like, a second color measurement set inclusive of M×N patches (same number of patches, different colors) is received corresponding to the second page. The skilled artisan will appreciate that a third such color measurement set is capable of including less than M×N patches, so as to reflect the color output capabilities of the associated document processing device 104 being subject to color calibration. Operations with respect to FIG. 10 then return to step 1006, whereupon the color measurement data of the at least second color measurement set is converted to RGB color space. The methodology of FIG. 10 then continues with respect to the second color measurement set from step 1008 onward, as will be appreciated by those skilled in the art. It will further be appreciated by those skilled in the art that the generation of the profile data is capable of being accomplished with redundant elements in the first and second color measurement data.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for iteratively acquiring optical color measurements for device color profiling comprising:
    a scanner input operative to receive a first color measurement data set corresponding to a measured value for each of a plurality of L discrete printed color patches in an M row by N column planar array thereof, wherein the color measurement data is encoded in a first multidimensional color space, and wherein L, M and N are positive integers greater than 2, and wherein L is less than M×N;
    a color data input operable to receive color data corresponding to each measured value, wherein the color data is encoded in a second multidimensional color space;
    a display operable to generate a visual rendering of display color patches arranged in M rows and N columns and corresponding to each printed color patch, which visual rendering is completed from color measurement data encoded in a second multidimensional color space;
    a profile generator operable to generate profile data corresponding to a transition between color data and color measurement data in accordance with a relationship between available corresponding printed color patches and displayed color patches;
    a partial result generator operable to generate, when L is less than M×N, a visual indicator corresponding to one of the M rows on the display, which row corresponds to a row wherein the current L value resides;
    an input operable to receive at least a second color measurement data set uniquely defined from the first color measurement data set, and which second color measurement data set includes a plurality of the M×N patches not found in the first color measurement data set; and
    wherein the color profile generator is operable to further generate the profile data in accordance with the second color measurement data set.

2. The system of claim 1 further comprising a display generator operable to generate a visual indicator on the display corresponding to each of the L patches.

3. The system of claim 2 wherein the first color space includes RGB components and wherein second color space includes CMYK components.

4. The system of claim 1 wherein the profile generator is further operable to generate the profile data with redundant elements in the first color measurement data and the second color measurement data.

5. The system of claim 1 further comprising a truncator operable to truncate elements of each color measurement data set not evenly divisible by M, such that only complete rows are retained in each set.

6. A method for iteratively acquiring optical color measurements for device color profiling comprising the steps of:
    receiving a first-color measurement data set corresponding to a measured value for each of a plurality of L discrete printed color patches in an M row by N column planar array thereof, wherein the color measurement data is encoded in a first multidimensional color space, and wherein L, M and N are positive integers greater than 2, and wherein L is less than M×N;
    receiving color data corresponding to each measured value, wherein the color data is encoded in a second multidimensional color space;
    generating, on an associated display, a visual rendering of display color patches arranged in M rows and N columns and corresponding to each printed color patch, which visual rendering is completed from color measurement data encoded in a second multidimensional color space;
    generating profile data corresponding to a transition between color data and color measurement data in accordance with a relationship between available corresponding printed color patches and displayed color patches;
    generating, when L is less than M×N, a visual indicator corresponding to one of the M rows on the display, which row corresponds to a row wherein the current L value resides;
    receiving at least a second color measurement data set uniquely defined from the first color measurement data set, and which second color measurement data set includes a plurality of the M×N patches not found in the first color measurement data set; and
    generating the profile data in accordance with the second color measurement data set.

7. The method of claim 6 further comprising the step of generating a visual indicator on the display corresponding to each of the L patches.

8. The method of claim 7 wherein the first color space includes RGB components and wherein second color space includes CMYK components.

9. The method of claim 6 further comprising the step of generating the profile data with redundant elements in the first color measurement data and the second color measurement data.

10. The method of claim 6 further comprising the step of truncating elements of each color measurement data set not evenly divisible by M, such that only complete rows are retained in each set.

11. A system for iteratively acquiring optical color measurements for device color profiling comprising:
    means adapted for receiving a first color measurement data set corresponding to a measured value for each of a plurality of L discrete printed color patches in an M row by N column planar array thereof, wherein the color measurement data is encoded in a first multidimensional color space, and wherein L, M and N are positive integers greater than 2, and wherein L is less than M×N;

means adapted for receiving color data corresponding to each measured value, wherein the color data is encoded in a second multidimensional color space;

means adapted for generating, on an associated display, a visual rendering of display color patches arranged in M rows and N columns and corresponding to each printed color patch, which visual rendering is completed from color measurement data encoded in a second multidimensional color space;

means adapted for generating profile data corresponding to a transition between color data and color measurement data in accordance with a relationship between available corresponding printed color patches and displayed color patches;

means adapted for generating, when L is less than M×N, a visual indicator corresponding to one of the M rows on the display, which row corresponds to a row wherein the current L value resides;

means adapted for receiving at least a second color measurement data set uniquely defined from the first color measurement data set, and which second color measurement data set includes a plurality of the M×N patches not found in the first color measurement data set; and means adapted for generating the profile data in accordance with the second color measurement data set.

12. The system of claim 11 further comprising means adapted for generating a visual indicator on the display corresponding to each of the L patches.

13. The system of claim 12 wherein the first color space includes RGB components and wherein second color space includes CMYK components.

14. The system of claim 11 further comprising means adapted for generating the profile data with redundant elements in the first color measurement data and the second color measurement data.

15. The system of claim 11 further comprising means adapted for truncating elements of each color measurement data set not evenly divisible by M, such that only complete rows are retained in each set.

* * * * *